INVENTORS
GLENN DONALD BRYANT and
ABERDEEN WILSON STEWART
BY
Jerome A. Gross,
THEIR ATTORNEY

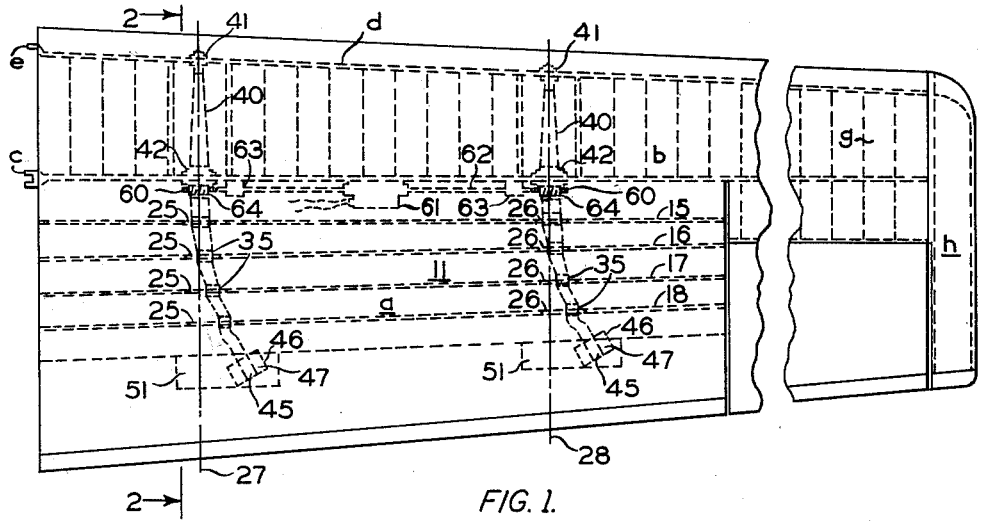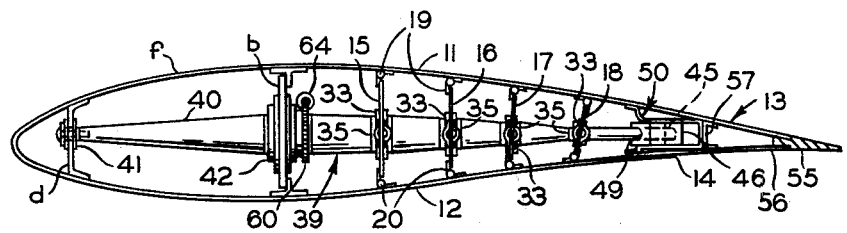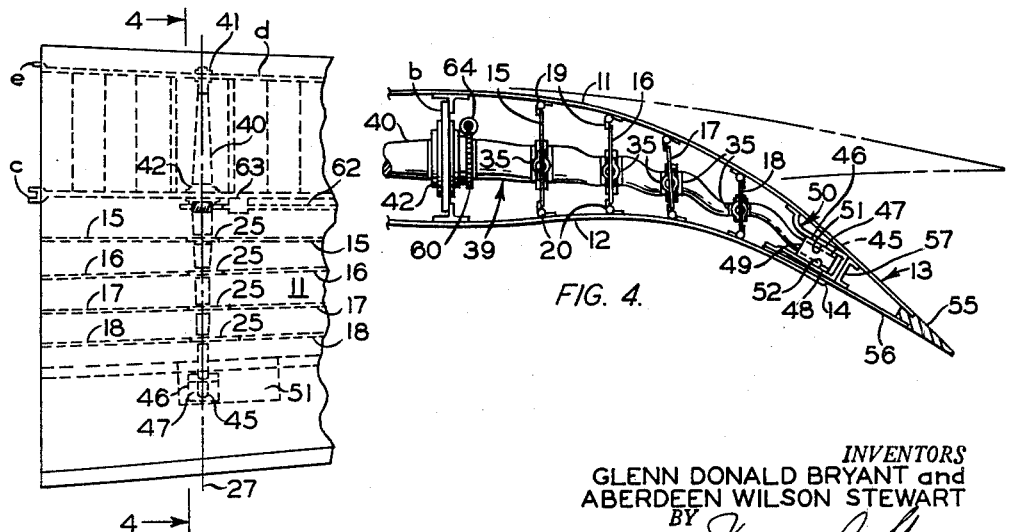

3,109,613
VARIABLE-CAMBER AIRFOIL
Glenn D. Bryant and Aberdeen Wilson Stewart, Starkville, Miss., assignors to Mabel Wilson Raspet, Starkville, Miss.
Filed Nov. 28, 1960, Ser. No. 72,148
8 Claims. (Cl. 244—44)

This invention relates to variable camber airfoils, and particularly to the structure and mechanism of wings whose camber is to be varied from that of a nearly symmetrical airfoil to one which possesses exceptional high lift characteristics.

A purpose of the present invention is to accomplish such variation in camber without detraction from smoothness of airfoil contour. Another purpose is to provide mechanism which produces camber change gradually but in numerous positive increments along the wing chord between the spar and the trailing edge of the wing, and, if desired, between the spar and the leading edge also. An additional purpose is to provide mechanism which vertically deflects and angularly positions the edge-former structure relative to the spar. A further purpose is to actuate the structure substantially along the camber line itself, and to provide structure suited for such camber line actuation. A still further purpose is to provide positive operating control over a variable-camber wing so that change in camber may be readily effected during flight.

These purposes, together with others which will be apparent from the specification which follows, are achieved in the present invention generally by providing a basic airfoil structure which comprises a wing with bendable, preferably shear-resistant skins, a fixed spar, an edge-former, and one or more intermediate spanwise webs hingedly connected to and between the skins. The means which varies the camber of this structure consists of angularly adjustable cranks mounted upon the spar and extending through fittings in the webs, to the edge-former. On being rotated, the crank throws deflect the webs and the edge-former with reference to the spar. The deflection is referred to as "normal" to the airfoil; in a cross-section through the airfoil it is substantially perpendicular to the chord line (that is, vertical, assuming the chord line is horizontal); the airfoil deflection has no spanwise component. The end throw is canted, to re-position the edge-former angularly as it is deflected vertically. Fittings which mount the throws to the webs and edge-former permit both rotation and spanwise movement, to accommodate the spanwise component of the rotational movement of the crank throws. The web mounting fittings also have freedom for angular movement on spanwise axes.

The new structure is unique in that the camber-line cranks constitute the sole means by which the so-called "normal" air-loads (principally the lifting force) imposed upon the webs and the trailing edge are transferred to the spar. Thus, the mechanism which varies the wing camber serves as primary structure which transfers these air-loads.

The new variable-camber airfoil is effectively used, in the embodiment illustrated, instead of the conventional wing-and-flap configuration. In the accompanying drawings:

FIGURE 1 is a plan view of such variable-camber wing in minimum camber position.

FIGURE 2 is a sectional view taken along line 2—2 of FIGURE 1.

FIGURE 3 is a fragmentary plan view similar to the left end of FIGURE 1, showing the wing in maximum camber position.

FIGURE 4 is a fragmentary sectional view taken along line 4—4 of FIGURE 3. The dashed lines show the undeflected section, for purpose of contrast.

Figure 5:
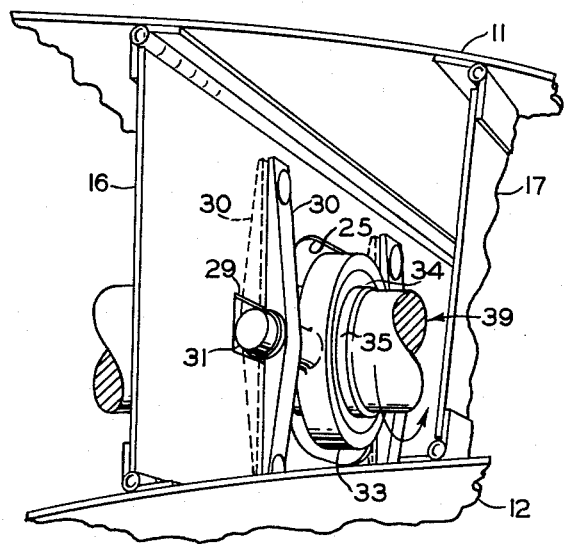
FIGURE 5 is a fragmentary perspective view showing a typical web portion and associated parts when positioned for minimum camber.

In FIGURE 1 is illustrated, in somewhat simplified form, a D-section wing having a variable-camber inner wing panel portion generally designated $a$ including a principal spar $b$ in the region of maximum thickness and terminating in a principal root fitting $c$, a leading edge spar $d$ having a drag fitting $e$, and a leading edge skin $f$. At the outer end of the variable camber section $a$ is a conventional aileron-equipped outer panel portion generally designated $g$ terminating in a wing tip $h$.

In contrast to the fixed-contour D-section construction of the leading edge shown, the portion of the wing aft of the principal spar $b$ can change its camber smoothly and progressively, from the nearly symmetrical section shown in FIGURE 2 to the highly-cambered section shown in FIGURE 4, in effect by re-positioning the camber line of the wing. This is accomplished by the structure and mechanism hereafter described in detail.

In the simple embodiment illustrated, shear-resistant bendable upper and lower skins 11 and 12 are provided, extending aft from the principal spar $b$ to a fixed-contour trailing edge member generally designated 13, hereinafter described. Conventional airfoil skins, such as aluminum or structural laminated fiber glass, have the necessary shear resistance, within the range of thicknessess which permit bending. Vertical deflection and angular re-positioning of the trailing edge member 13 is accomplished by providing a sliding overlap 14 of the lower skin 12 against the under-surface of the trailing edge member 13; obviously, more complex means which would permit relative chordwise movement between them might have been used.

A number of spanwise webs 15, 16, 17, 18, are employed between the spar $b$ and the fixed-contour trailing edge member 13. In flight, these webs 15–18, together with the portions which connect them to the skin and adjacent portions of the skin itself, constitute spanwise spar elements equivalent to those conventionally used in airfoil construction. However, as shown by contrasting FIGURE 4 with FIGURE 2, the webs 15–18 are deflectable to vary the camber of the airfoil between the spar $b$ and the trailing edge member 13, bending the skins 11 and 12 in smooth, airfoil-contoured curves.

Each of the webs 15, 16, 17, 18 has an upper continuous hinged connection 19 and a lower continuous hinged connection 20 to the upper and lower skins 11, 12, respectively. These hinged connections 19, 20 are spanwise, and they space the webs 15–18 at pre-selected spacings and angularity to permit deflection as shown in FIGURE 4. In the minimum camber position, shown in FIGURE 2, the webs 15–18 are seen to be affixed to the skin at angles to the vertical which increase progressively with their spacing aft of the spar $b$. The change to maximum camber, as shown in FIGURE 4, tilts the webs 15–18 into substantial parallelism, illustrating how camber change is accompanied by relative movement of the skins 11, 12, which varies the tilt of the webs relative to each other.

The webs 15–18 have chordwise-aligned, spanwise-elongated cut-outs 25, 26, located along parallel, chordwise-extending support lines 27, 28, the first nearer the root and the second nearer the outer panel $g$. The amount of the spanwise elongation of the cut-outs 25, 26 increases aft; it is least in the forward web 15 and most in the aft web 18, as is apparent from FIGURES 1 and 3. This difference in spanwise elongation lies all along one side (here, the outboard side) of the support lines 27, 28; it is used to accommodate the spanwise component of movement of the throws of the cranks 39 hereafter described.

Figure 6:
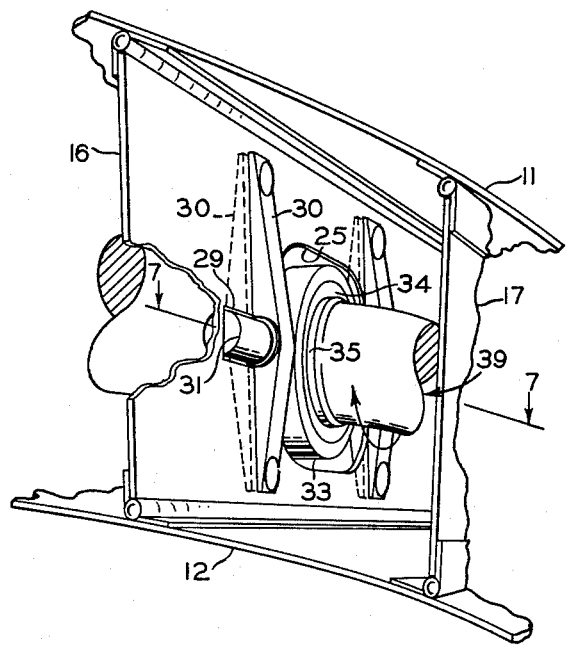
FIGURE 6 is a view similar to FIGURE 5 when positioned for maximum camber.
Figure 7:
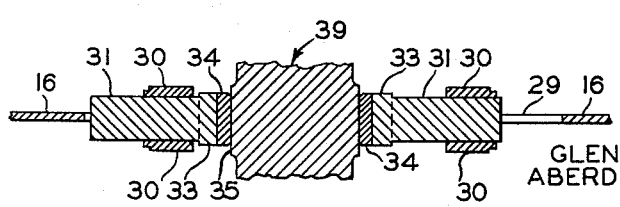
FIGURE 7 is a fragmentary sectional view taken along line 7—7 of FIGURE 6.

A typical cut-out 25 is shown in detail in FIGURES 5 and 6. At its mid-height along the web and most conveniently near the camber line of the wing, each cut-out 25 is intersected and enlarged on both sides by horizontal, spanwise slot portions 29. Bridging vertically across these slot portions 29 and spaced back-to-back against each other on both sides of the webs 15–18 are pairs of vertical journal-support brackets 30, one pair at the inboard side of the cut-outs 25, 26 and one at the outboard side. These support brackets 30 are aligned with each other along spanwise axes, to support journals or trunnions 31, for tilt about such axes. The line 7—7 of FIGURE 6 corresponds with one such spanwise trunnion axis. Spanwise movement along the axis is provided by sliding the journals or trunnions 31 in their brackets 30 within the limits of the slot portions 29.

The journals or trunnions 31 mount between them, within the cut-outs 25, 26, ring-like bearings 33, each having an inner bushing 34 which grasps one of the machined throws 35 of what may be generally designated camber-line cranks 39. Two such camber-line cranks are illustrated, one of them passing through the chordwise-aligned cut-outs 25 at the spanwise-inner support line 27, the other passing through the chordwise aligned cut-outs 26 at the spanwise-outer support line 28. The camber-line cranks 39 are generally horn-shaped. Where (as in the embodiment illustrated) the leading edge camber is not to be varied, the forward-projecting portions 40 are straight, and aligned with such support lines 27, 28, with the added support of a leading edge mounting bushing 41. In any event, the principal support of the cranks 39 will be in spar mounting bushings 42, preferably located about the level of the camber line of the wing and having chordwise axes of rotation. From a structural standpoint, the horn-like camber-line cranks 39 are cantilevered aft of the spar mounting bushings 42. These cranks carry the normal loads, such as lifting loads, imposed on the variable-camber structure. For bending strength and rigidity, the camber-line cranks 39 may advantageously taper in thickness from a maximum at the spar mounting bushings 42 to a much lesser thickness forward and aft.

Since the camber-line cranks 39 are formed similarly to each other, and their support lines 27, 28 are parallel and chordwise, variation in camber may be obtained by rotating the cranks 39 through an angle, conveniently of 90°, as shown by comparing FIGURE 1 with FIGURE 3. Arrows indicating the sense of angular adjustment are shown in FIGURES 5 and 6.

The throws 35 on the cranks 39 are spaced from each other corresponding to the spacing of the successive webs 15, 16, 17, 18; and in their order of progression from the spar they are progressively offset from the lines 27, 28 about which the cranks rotate. The amount of the offset at each web corresponds with the desired deflection of the camber line at the particular chordwise location. Thus, when the cranks are in the position shown in FIGURES 1 and 2, with their throws 35 all in a horizontal plane, the wing camber is at a minimum, with the airfoil section being nearly symmetrical. When the cranks 39 are turned 90° to the position shown in FIGURES 3 and 4, the vertical component of movement of the throws deflects the camber line from its original position, while the sliding of the journals or trunnions 31 in the support brackets 30 accommodates the spanwise component of movement of the throws 35.

The aft end of each of the horn-like cranks 39 is canted to provide the requisite change in angularity of the fixed-contour trailing edge member 13. Specifically, there is provided at each aft end a canted end pivot portion 45, which may have a machined cylindrical surface to provide pivoting. Rectangular operator blocks 46, having smooth parallel upper and lower surfaces 47, 48, are bored inward from their front ends to provide pivot bores 49, by which the operator blocks 46 are mounted on the canted end pivot portions 45 of the cranks 39. These operator blocks are permitted freedom of spanwise movement within the trailing edge member 13, as follows:

The fixed-contour trailing edge member 13 has a spanwise-extending structural support member generally designated 50 which includes upper and lower spanwise-extending parallel slide surfaces 51, 52, spaced to accommodate the upper and lower surfaces 47, 48 of the rectangular operator blocks 46 for sliding. The slide motion is spanwise with an angular component when viewed from above, as shown by a comparison of FIGURE 1 with FIGURE 3. The slide surfaces 51, 52 in the member 50 in effect furnish for the operator blocks 46, an operating groove presented forwardly toward the spar.

The operator blocks 46, pivoting on the canted end pivot portions 45 of the cranks 39, establish the change in angle of the trailing edge member 13, while the vertical component of the "throw" of the pivot portions 45 effects its vertical deflection with reference to the spar. Any convenient structure may be provided for the remainder of the fixed-contour trailing edge member 13. In the embodiment shown, the upper skin 11 continues aft of an upper flange of the structural member 50 to a trailing-edge arrowhead extrusion 55. On the lower surface, a supplemental trailing-edge skin 56 extends from the arrowhead extrusion 55 forward to join a lower support flange of the member 50; the supplemental skin 56 is overlapped by the lower wing skin 12. The upper skin 11 and the supplemental trailing-edge skin 56 are also supported by the flanges of a trailing-edge channel 57 whose web is secured to the aft end of the structural member 50.

The angular position of the cranks 39 is controlled simultaneously by worm-and-spur gearing. In the simple embodiment shown, spur gears 60 are mounted on each of the cranks 39, concentric with the axes of crank rotation. Between the cranks 39 there is mounted to the aft side of the spar $b$ a reversible rotary actuator 61 which may be powered by electricity from a source not shown. The actuator 61 has a spanwise shaft 62 supported from the spar $b$ by pillow blocks 63 and provided at its end with worm gears 64 which engage the spur gears 60 for simultaneous actuation. By cockpit controls, not shown, the power to the rotary actuator 61 is engaged and disengaged to adjust the angular position of the cranks 39 simultaneously.

It may be desired to change the camber of a wing by "drooping" its leading edge. It would be an obvious modification to apply the present mechanism so to change the leading edge camber. The distance from the principal spar of the wing to its leading edge will be less than to its trailing edge; therefore such leading edge "droop" may be obtainable by repositioning it in the same manner as here shown for the trailing edge member 13, using fewer or no intermediate webs.

It is further apparent that the mechanism shown fragmentarily in FIGURE 4 might be completed symmetrically about the spar by substituting elements forward of the spar which were generally equivalent to those aft of the spar. Specifically, these might include forward horn-like curvature of the cranks ending in canted forward-end portions with pivoted operator blocks which deflected and angularly re-positioned a grooved leading edge similar to the trailing edge described. This would change the camber of both the leading and trailing edges simultaneously. In such case the air loads normal to the wing section would all be transmitted by such cranks to the spar mounting bushings 42.

While this specification has referred particularly to wings, and used orienting terms such as "horizontal" and "vertical," the invention may as well be used in other applications and orientations, such as for vertically-positioned control surfaces. In such use the camber-varying mechanism would be arranged to deflect the camber of an airfoil from a central, symmetrical configuration to camber at either side.

Other variations in mechanism and in structure will suggest themselves to those skilled in the design and construction of aircraft. Accordingly, this invention should not be construed narrowly, but instead as co-extensive with the claims hereof.

We claim:

1. Variable-camber airfoil construction of the type having a spar, upper and lower bendable skins, a plurality of spanwise webs spaced from the spar and from each other and joining said skins, and angularly-adjustable means between the skins and supported by the spar along a chordwise axis to transfer lifting loads from the spanwise webs to the spar, characterized in that the said angularly-adjustable means include throws at the successive webs progressively offset from the axis, further characterized in that the throws turn within fittings mounted to and movable spanwise relative to the webs, whereby to deflect the webs normal to the airfoil without moving them spanwise.

2. Variable-camber airfoil construction as defined in claim 1, further characterized in that the webs have spanwise hinges joining them to the skins, and each lifting load-transfer fitting includes a spanwise pivot.

3. Variable-camber airfoil construction as defined in claim 1, further characterized in that the said angularly-adjustable means has an offset canted end portion, and the airfoil has a spanwise edge-former member supported and positioned angularly by said offset canted end portion, and there is accommodated within the edge-former member a spanwise-movable operator.

4. A variable-camber airfoil including a fixed spar, bendable shear-resistant skins, an edge-former, a web hingedly connected to and between the skins and extending spanwise spacedly between the spar and the edge-former, and a plurality of angularly adjustable means mounted onto the spar to deflect the web and edge former with reference to the spar and to position the edge-former angularly, said means having fittings mounting the web and edge-former thereon with freedom for spanwise movement, the web-mounting fittings further having freedom for angular movement.

5. A variable-camber wing comprising a spar, an edge member, upper and lower skins between the spar and the edge member, a plurality of spanwise webs spaced at intervals between the spar and the edge member, hinged connections joining the spanwise webs to the upper and lower skins, a plurality of spanwise movable mountings for each web, each including a journal tiltable about a spanwise axis, support bushings within the web mountings, and a plurality of camber-line cranks supported by the spar for angular adjustment on parallel chordwise axes, the cranks having spaced from the spar a plurality of throws, one fitted within each of the web support bushings, the throws being offset progressively from the spar, together with control means to adjust the angular position of the camber-line cranks simultaneously.

6. A variable-camber wing comprising a spar, a fixed-contour movable edge member, upper and lower skins between the spar and the edge member, means to permit relative chordwise movement between the edge member and one of said skins, an operating groove in the edge member presented toward the spar and having slide surfaces extending spanwise, a plurality of operator blocks accommodated slidingly within the operating groove, and a plurality of camber-line cranks supported by the spar for angular adjustment on parallel chordwise axes, each crank having a canted end pivot portion upon which one of said operator blocks is pivotally mounted, together with control means to adjust the angular position of the camber-line cranks simultaneously.

7. A variable-camber wing comprising a fixed leading edge portion terminating in a spar, a fixed-contour movable trailing edge member, shear-resistant upper and lower skins between the spar and the edge member, means to permit relative chordwise movement between the edge member and one of said skins, a plurality of spanwise webs spaced at intervals between the spar and the edge member, hinged connections joining the spanwise webs to the upper and lower skins, a plurality of spanwise movable mountings for each web, each including a journal tiltable about a spanwise axis, support bushings within the web mountings, an operating groove in the edge member presented toward the spar and having slide surfaces extending spanwise, a plurality of operator blocks accommodated slidingly within the operating groove, and a plurality of camber-line cranks supported by the spar for angular adjustment on parallel chordwise axes, the cranks having spaced from the spar a plurality of throws, one fitted within each of the web support bushings, the throws being offset progressively from the spar, each crank having a canted end pivot portion upon which one of said operator blocks is pivotally mounted, together with control means to adjust the angular position of the camber-line cranks simultaneously.

8. A variable-camber wing including a fixed spar, upper and lower skins, an edge-former, a spanwise movable operator slide within the edge-former, a web connecting the skins and extending spanwise between the spar and the edge-former, and rotatable camber-line means to deflect the web vertically, said means having an aft end portion rotatably engaging the slide to move it spanwise within the edge-former and simultaneously deflect the edge-former vertically and angularly, whereby to increase the camber of the wing.

References Cited in the file of this patent

UNITED STATES PATENTS 1,823,069    Stroop _____ Sept. 15, 1931

FOREIGN PATENTS 631,287    France _____ Sept. 12, 1927